(12) United States Patent
Kurd (10) Patent No.: US 8,099,450 B2
(45) Date of Patent: Jan. 17, 2012

(54) MULTIPLICATION CIRCUITRY

(75) Inventor: Tariq Kurd, Bristol (GB)

(73) Assignee: STMicroelectronics (Research & Development) Ltd., Buckinghamshire (GB)

( * ) Notice: Subject to any disclaimer, the term of this patent is extended or adjusted under 35 U.S.C. 154(b) by 1150 days.

(21) Appl. No.: 11/490,475

(22) Filed: Jul. 20, 2006

(65) Prior Publication Data

US 2007/0043802 A1 Feb. 22, 2007

(30) Foreign Application Priority Data

Jul. 20, 2005 (EP) .................................... 05254527

(51) Int. Cl.
*G06F 7/52* (2006.01)
(52) U.S. Cl. ..................................................... 708/629
(58) Field of Classification Search ........... 708/620–632
See application file for complete search history.

(56) References Cited

U.S. PATENT DOCUMENTS 5,794,181 A * 8/1998 Benbassat et al. ............ 708/628
6,434,586 B1 8/2002 Carlson et al.

OTHER PUBLICATIONS

K'Andrea C. Bickerstaff et al., "Analysis of Column Compression Multipliers", Proceedings of the 15th IEEE Symposium on Computer Arithmetic, Vail, CO., Jun. 11-13, 2001, pp. 33-39.
Pedram Mokrian et al., "On the Use of 4:2 Compressors for Partial Product Reduction", Canadian Conference on Electrical and Computer Engineering, Montreal, Canada, May 4-7, 2003, Canadian Conference on Electrical and Computer Engineering, New York, NY: IEEE, U.S., vol. 3 of 3, pp. 121-124.
Alejandro F. Gonzalez et al., "Redundant Arithmetic, Algorithms and Implementations", Integration, the VLSI Journal, North-Holland Publishing Company, Amsterdam, NL, vol. 30, No. 1, Nov. 2000, pp. 13-53.
European Search Report dated Oct. 25, 2005 in connection with European Patent Application No. 05 254 527.4.

* cited by examiner

*Primary Examiner* — Tan V Mai (57) ABSTRACT

Combining circuitry for combining a plurality of multi-bit partial product terms in a multiplier circuit includes a plurality of compression columns, each column receiving a plurality of partial product term bits. At least one compression column includes: a first circuit arranged to receive a first set of the plurality of partial product term bits for the at least one compression column, the first circuit further arranged to combine the first set of term bits to produce a first combined term bit set; and a second circuit arranged to receive a second set of the plurality of term bits for the at least one compression column and all of the first combined term bit set.

20 Claims, 6 Drawing Sheets

MULTIPLICATION CIRCUITRY

TECHNICAL FIELD OF THE INVENTION

The present invention relates to multiplication circuitry. In particular but not exclusively, the present invention relates to multiplication circuitry for multiplying two 32-bit operands.

BACKGROUND OF THE INVENTION

A typical binary multiplier for multiplying two binary numbers together comprises a series of processing stages, such as an operand encoder, a partial product generator, a product term compressor, and a final term addition stage.

The operand encoder encodes the first operand and reduces the number of terms representing the operand. Thus, for example, a 32-bit number may be reduced using a Booth code to 17 terms or fewer.

The partial product generator multiplies the second operand by each of the encoded terms to produce a partial product term. Thus, for a 32-bit multiplier where the first operand is encoded as 17 terms, a total of 17 partial product terms are produced.

The product term compressor adds together (or as otherwise known compresses) the many partial products to form a pair of terms.

Finally, the final term addition stage adds the pair of terms together to form the final product value.

Figure 1:
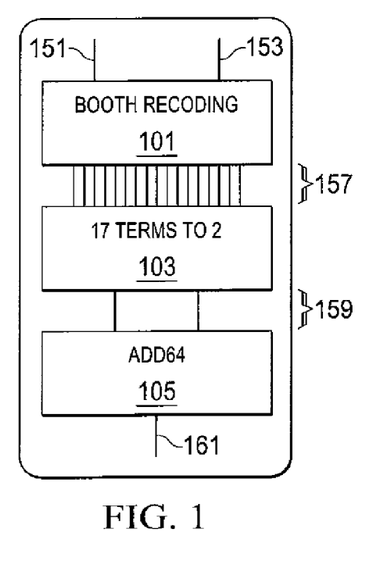
FIG. 1 shows a schematic view of a typical multiplier as known in the art.

FIG. 1 shows a typical 32-bit multiplier structure whereby first and second operands 151 and 153 are input into a "Booth recoding" stage 101, which carries out the operand encoding stage and the partial product generation stage to generate 17 partial product terms 157.

The 17 partial product terms 157 are fed into the compression circuitry, shown as "17 terms to 2" compressor 103 to output two 64-bit terms 159.

The 64-bit output terms 159 are passed to the final term addition stage, the "add64" block 105, to produce a final product value 161.

Compression circuitry, such as the "17 term to 2" compressor 103 shown in FIG. 1, has typically been designed to reduce all the possible partial product terms generated by the operand to form 2 terms within the smallest number of consecutive stages. Conventionally, the compression circuitry is arranged in terms of columns of compression stages. Each compression stage column operates by combining term bits having the same binary weighting (i.e. $2^n$), each column compressing up to 17 terms.

The typical compression column is designed in such a way that it is input insensitive and therefore capable of handling any of the 17 terms in any particular order. However, this type of design is problematic in that an element of redundancy has to be built into the compression column to allow for every possibility.

For example, if any retiming of the product terms is carried out to allow pipelining of the compression elements, the memory elements for storing the terms for pipeline retiming all of the terms (such as flip-flops) have to be capable of handling the full partial product width of 64 bits. Such a design is wasteful in terms of circuitry.

Furthermore, this input insensitive design where the compression stages are designed to handle all of the input terms at a specific stage is wasteful in terms of the number of compression elements required within the stage. The conventional compression column introduces compression cells where not all of the inputs are attached to terms.

Furthermore, not only are the conventional designs wasteful in terms of circuitry, but they also force the user to implement over-cautious input value timing constraints requiring the previous partial product generation stages to generate all of the partial products substantially at the same time.

SUMMARY OF THE INVENTION

To address the above-discussed deficiencies of the prior art, an object of the present invention is to reduce the degree of redundant circuitry and lessen the timing constraints imposed on previous stages of the binary multiplier with respect to multiplication of binary numbers.

There is provided according to the invention combining circuitry for combining a plurality of multi-bit partial product terms in a multiplier circuit. The circuitry comprises a plurality of compression columns, where each column receives a plurality of partial product term bits. At least one compression column comprises: a first circuit arranged to receive a first set of the plurality of partial product term bits for the at least one compression column, the first circuit further arranged to combine the first set of term bits to produce a first combined term bit set; and a second circuit arranged to receive a second set of the plurality of term bits for the at least one compression column and all of the first combined term bit set.

Embodiments of the invention described in the following have the advantage over the prior art of lessening the timing constraints imposed on the production of the second set of the plurality of term bits, as they are not required in the process until later than the first set of the plurality of terms bit and that all of the first and second set of the plurality of bits are ready to be processed by the second circuit.

The second circuit may be a clocked buffer arranged to output the second set of the plurality of term bits and all of the first combined term bit set dependent on a clocked input.

This has the advantage over the prior art of specifically lessening the timing constraints of the second set prior to buffering of the combined set and the second set.

The at least one column may further comprise a third circuit arranged to receive all of the first combined term bit set and is further arranged to combine the first combined term bit set to produce a second combined term bit set.

Embodiments of the invention may further have the advantage over the prior art that the timing constraints with regards to the second set are once more lessened, as they are not required to pass through a further combining circuit.

The at least one column may further comprise a fourth circuit arranged to receive the second combined term bit set from the third circuit and the second set of plurality of term bits from the second circuit and is further arranged to combine the second combined term bit set and the second set of plurality of term bits to produce a pair of term bits.

The combining circuit may further comprise at least one further compression column comprising: a further first circuit arranged to receive a first set of the plurality of term bits for the further compression column, the further first circuit further arranged to combine the first set of term bits to produce a first combined term bit set; and a further second circuit arranged to receive all of the first combined term bit set.

Embodiments of the invention may further have the advantage over the prior art of using simplified circuitry, where the second set of term bits for a specific compression column is known to always not have a value.

The further second circuit of the further column may be a clocked buffer arranged to output all of the first combined term bit set dependent on a clocked input.

Embodiments of the invention may therefore have the advantage over the prior art (where the second set of term bits for a specific column is known to always not have a value) of a simplified buffer only required to handle the first combined term bit set.

The at least one further compression column may further comprise a further third circuit arranged to receive all of the first combined term bit set and is further arranged to combine the first combined term bit set to produce a second combined term bit set.

The second combined term bit set from the further third circuit may be a pair of bits.

Embodiments of the invention may therefore have the advantage over the prior art (where the second set of term bits for a specific column is known to always not have a value) by reducing the number of circuits required to produce the pair of bit terms.

The combining circuitry may comprise a first number (n) of compression columns and a second number (m) of further compression columns.

The first number (n) of compression columns may be equal to the number of bits of the widest of the second set of the plurality of terms.

The second number (m) may be equal to the first number (n) subtracted from the number of bits of the widest of the plurality of partial product terms.

The second circuit may be further arranged to combine the second set of the plurality of term bits for the at least one compression column and all of the first combined term bit set to produce a second combined term bit set.

The compression column may further comprise a third circuit arranged to receive the second combined term bit set and a third set of the plurality of term bits for the at least one compression column, and to further combine the second combined term bit set and the third set of the plurality of term bits for the at least one compression column to produce a third combined term bit set.

According to a second aspect of the invention, there is provided a method for combining a plurality of multi-bit partial product terms in a compression column of a multiplier circuit, comprising the steps of: receiving at a first circuit a first set of the plurality of partial product term bits for the at least one compression column; combining at a first circuit the first set of term bits to produce a first combined term bit set; receiving at a second circuit a second set of the plurality of term bits for the at least one compression column and all of the first combined term bit set.

The method may further comprise the step of buffering, at the second circuit, the second set of the plurality of term bits and all of the first combined term bit set.

The method may further comprise the steps of: receiving at a third circuit all of the first combined term bit set, and combining at the third circuit the first combined term bit set to produce a second combined term bit set.

The method may further comprise the steps of: receiving at a fourth circuit the second combined term bit set from the third circuit and the second set of the plurality of term bits from the second circuit, and combining the second combined term bit set and the second set of plurality of term bits to produce a pair of term bits.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present invention and to show how the same may be carried into effect, reference will now be made by way of example only to the accompanying drawings, in which like reference numerals represent like parts, and in which.

DETAILED DESCRIPTION

FIGS. 2 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged circuitry.

For the following examples, a multiplier block (and stages for the multiplier block) for 32-bit operands is described. As would be understood by a person skilled in the art, these techniques are not limited only to the examples described below but are equally applicable to multiplier blocks capable of performing operations on operands greater than or less than 32 bits.

The encoding, partial product generation, and addition stages of 32-bit multiplication blocks are not described in further detail. However, for the examples described with reference to FIGS. 2 to 8, the encoding stage is assumed to implement a Booth coding algorithm which when input to the second stage produces 17 partial products. There are additionally 16 carry bits which can be inserted as known in the art into any of the 17 partial product terms to be compressed wherever a free slot occurs. There are therefore 17 partial product terms to be compressed.

Figure 2:
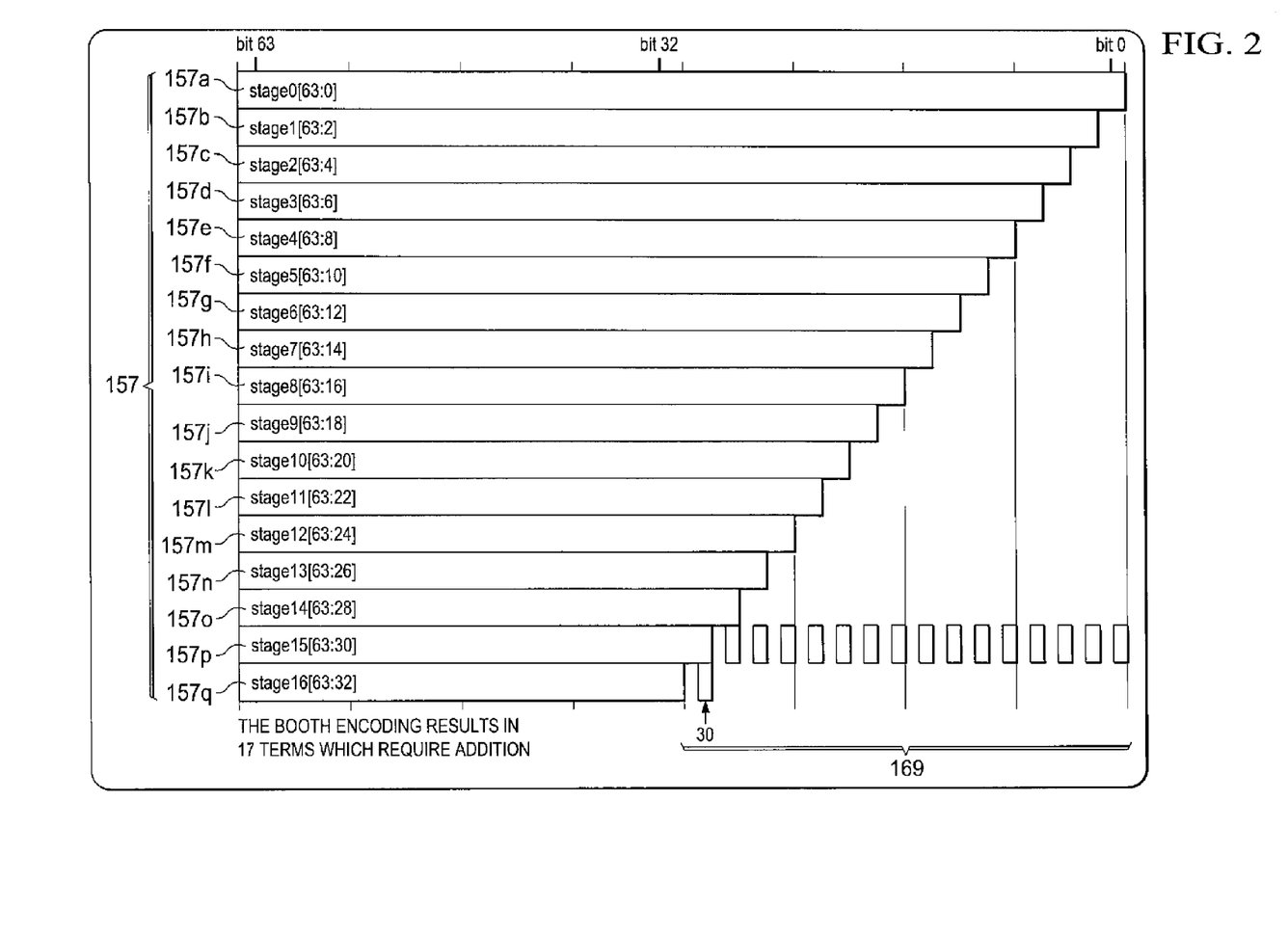
FIG. 2 shows a schematic view of the partial product values at the output of the Booth recoding stage as shown in FIG. 1.

FIG. 2 shows a typical range of outputs from the Booth recoding stage 101 to be inserted into the compression stage. FIG. 2 also shows the relative weighting of the 17 partial product terms, which are called stages in FIG. 2, starting from stage0 157a to stage16 157q. Stage0 157a has bits ranging in weighting from $2^0$ to $2^{63}$, i.e. stage0 157a is 64 bits wide. Subsequent stages have smaller bit ranges; stage1 157b is 62 bits wide ranging from $2^2$ to $2^{63}$, stage2 157c is 60 bits wide ranging from $2^4$ to $2^{63}$, with each subsequent partial product or stage being 2 bits shorter than the previous stage until reaching stage16 157q, which is 34 bits wide with bit weighting ranging from $2^{32}$ to $2^{63}$.

Furthermore, FIG. 2 shows the typical application of the carry term 169 inserted into stage15 157p and stage16 157q.

As has been described previously and will be shown below, the product term compressor carries out the compression of the partial product terms in a series of compression stages. Within each of the stages, the bits of terms with the same weighting are arranged in compression columns to be input to compression circuit cells. The output terms of these compression cells, which is a smaller number than the number of input terms, are then sorted into weighting groups and passed to the next compression stage to be reduced further in numbers.

Examples of compression circuit cells are full adders and 4:2 compressors. Both the full adder 205, 203 and the 4:2 compressor 201 are shown in FIG. 3.

Full adders 205, 203 are well known in the art and receive 3 input terms, typically two bit inputs (a,b) and a carry input (c) all with the same binary weighting ($2^n$), and produce two outputs, a sum output (s) with the same binary weighting as the inputs and a carry output (c) with a higher binary weighting ($2^{n+1}$).

4:2 compressor cells receive 5 outputs and produce 3 outputs and are therefore more efficient per stage in compressing terms. They receive 4 bit inputs (a,b,c,d) and a carry input (ci) all with the same binary weighting ($2^n$), and produce a sum output (s) with the same binary weighting as the inputs and two carry outputs (c,co) with a higher binary weighting ($2^{n+1}$). In order to simplify the description of the circuits described hereafter, the carry output c is described as being the inter carry output (as it is used to carry values between compressor cells between stages), whereas the carry output co is described as being the intra carry output (as it is used to carry values between compressor cells within a stage). It would be appreciated by a person skilled in the art that as the weighting of a carry is the same, this labeling is not limiting, and the intra carry outputs could be used as inter carry outputs and vice versa. However, as a person skilled in the art will appreciate, the use of intra carry outputs as inter carry outputs and vice versa, although logically acceptable and possible, is not typically carried out because these arrangements have less than optimal delay paths.

Figure 3:
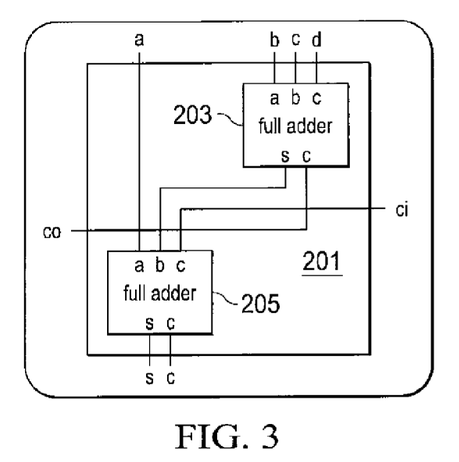
FIG. 3 shows a schematic view of a known 4:2 compressor cell.

FIG. 3 shows a typical 4:2 compressor cell comprising 2 full adders. The first full adder 203 receives three of the bit inputs to the 4:2 compressor (b,c,d) as inputs and outputs a sum bit and a carry bit. The first full adder carry bit forms the intra carry output of the 4:2 compressor (co). The second full adder 205 receives the remaining input to the 4:2 compressor (a), the carry input to the 4:2 compressor (ci) and the sum output from the first full adder 203. The second full adder sum output forms the sum output from the 4:2 compressor (s), and the second full adder carry output forms the inter carry output from the 4:2 compressor (c).

4:2 compressor cell structures comprising circuitry other than full adders carrying out the same functionality are also known.

Figure 4:
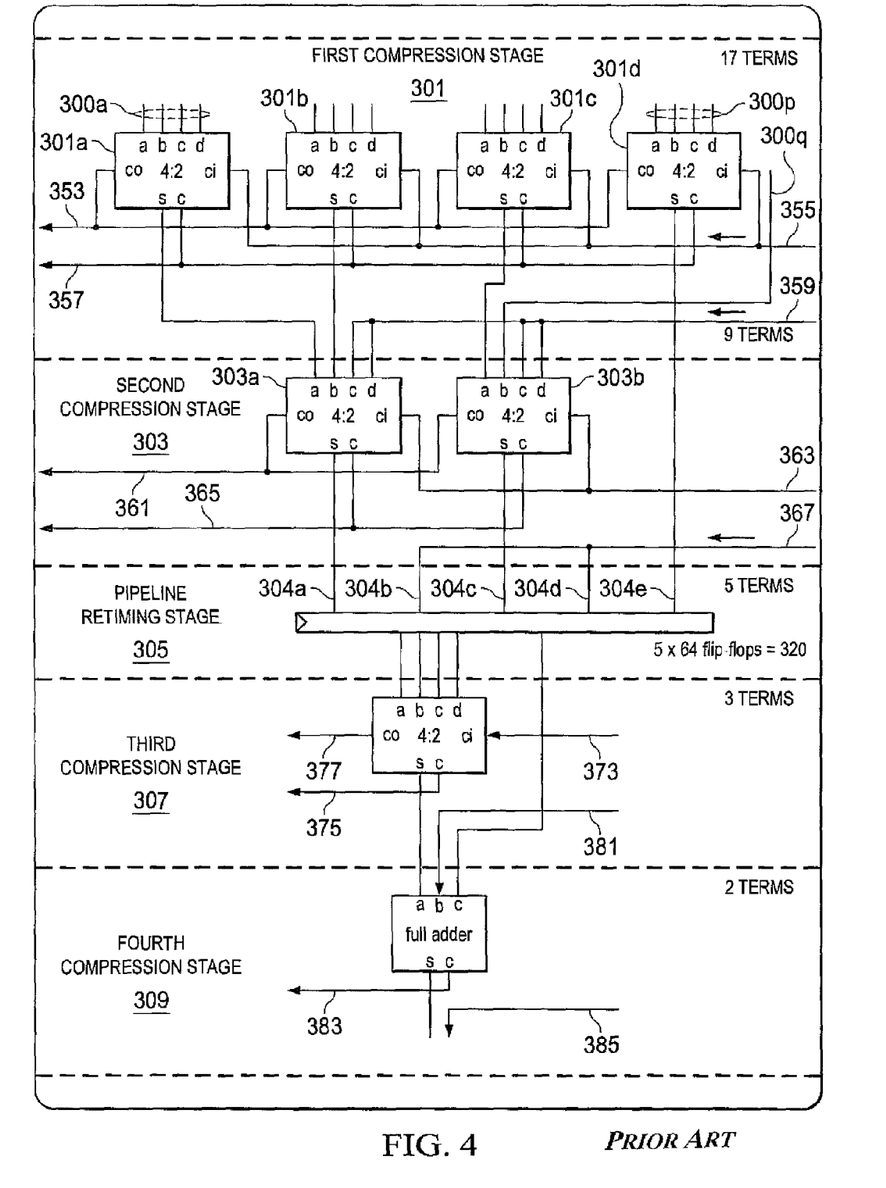
FIG. 4 shows a schematic view of part of a known compression circuit comprising known 4:2 compressor cells as shown in FIG. 3.

With reference to FIG. 4, a conventional compression circuit column for compressing 17 terms to 2 terms comprising 4:2 compressor cells is shown. In this example, the column handles the term bits with a weighting of $2^n$. The conventional compression circuit comprises 4 compression stages 301, 303, 307, and 309 and a pipeline retiming stage 305.

The first compression stage 301 receives the 17 partial product input terms 300a to 300q, each with a bit weighting $2^n$, and comprises four 4:2 compressor cells 301a, 301b, 301c and 301d.

Each first stage compressor cell 301 receives as inputs 4 partial product terms (i.e. $2^n$), and a further input from an intra carry out 355 from an adjacent lower weighting first stage compression column (not shown) (i.e. from first stage column $2^{n-1}$).

Each first stage compressor cell 301 outputs a sum term which is passed to the second compression stage 303 (i.e. to second stage column $2^n$), a intra carry out term 353 which is passed to an adjacent higher weighting first stage compression column (not shown) (i.e. to first stage column $2^{n+1}$), and a inter carry out term 357 which is passed to an adjacent higher weighting second stage compression column (not shown) (i.e. to second stage column $2^{n+1}$).

The first stage therefore only processes 16 from the 17 partial product terms. The $17^{th}$ term 300q is received by the first compression stage 301 and passed to the second compression stage 303 (i.e. to second stage column $2^n$).

The second compression stage 303 receives 9 terms from the first compression stage, 4 first compression stage sum outputs from the same column (i.e. from first stage column $2^n$), 4 first compression stage inter carry outputs 359 from the adjacent lower weighting column (not shown) (i.e. from first stage column $2^{n-1}$), and the $17^{th}$ partial product term 300q from the first compression stage 301.

The second compression stage 303 comprises two 4:2 compression cells 303a and 303b.

One of the compressor cells 303b receives one input from the first compression stage sum output from the same column (i.e. from first stage column $2^n$), two further inputs from the first compression stage inter carry outputs 359 from the adjacent lower weighting column (not shown) (i.e. from first stage column $2^{n-1}$), a fourth input from the $17^{th}$ partial product term 300q from the first compression stage 301, and a fifth input from the intra carry output 363 from the second compression stage from the adjacent lower weighting column (not shown) (i.e. from second stage column $2^{n-1}$).

The other of the compressor cells 303a receives two inputs from the first compression stage sum output from the same column (i.e. from first stage column $2^n$), two further inputs from the first compression stage inter carry outputs 359 from the adjacent lower weighting column (not shown) (i.e. from first stage column $2^{n-1}$), and a fifth input from the intra carry output 363 from the second compression stage adjacent lower weighting column (not shown) (i.e. from second stage column $2^{n-1}$).

Each second stage compressor cell 303a, 303b outputs a sum term which is passed to the pipeline retiming stage 303 (i.e. to retiming stage column $2^n$), an inter carry out term 365 which is passed to an adjacent higher weighting compression column pipeline retiming stage (not shown) (i.e. to retiming stage column $2^{n+1}$), and an intra carry out term 361 which is passed to an adjacent higher weighting second stage compression column (not shown) (i.e. to second stage column $2^{n+1}$).

The second compression stage 303 therefore only processes 8 from the 9 terms input from the first compression stage 301. The remaining unprocessed term received from the first compression stage 301, one of the sum outputs, is passed to the pipeline retiming stage 305 (i.e. to retiming stage column $2^n$).

The pipeline retiming stage 305 receives for each column 5 terms, 2 second compression stage sum outputs from the same column (i.e. from first stage column $2^n$), 2 second compression stage inter carry outputs 365 from the adjacent lower weighting column (not shown) (i.e. from second stage column $2^{n-1}$), and the sum output from the first compression stage passed through the second compression stage.

The pipeline retiming stage 305 for each column comprises 5 flip-flops (which are not individually shown in FIG. 4), which as known in the art are capable of capturing and storing a bit value, which can then be released via an output on receipt of a clocked signal.

The outputs from the five flip-flops are passed to the third compression stage 307.

The third compression stage 307 comprises a single 4:2 compression cell 307a, which receives 4 terms from the pipeline retiming stage 305 of the same column (i.e. from first stage column $2^n$) and a third compression stage intra carry output 373 from an adjacent lower weighting column third compression stage compressor cell (not shown) (i.e. from third stage column $2^{n-1}$).

The third stage compressor cell outputs a sum term which is passed to the fourth compression stage 309 (i.e. to fourth compression stage column 2.sup.n), an inter carry output 375 which is passed to an adjacent higher weighting fourth compression stage compression column (not shown) (i.e. to fourth compression stage column 2.sup.n+1) and an intra carry output 371 which is passed to an adjacent higher weighting third stage compression column (not shown) (i.e. to third compression stage column 2.sup.n+1).

The last output from the pipeline retiming stage 305 is not processed by the third compression stage 307 but is passed directly to the fourth compression stage 309.

The fourth compression stage 309 comprises a single full adder compressor cell 309a. However, some sub-optimal designs may use a 4:2 compression cell (not shown), where only some of the inputs and outputs are used. The adder 309a receives a term from the sum output of the third compression stage of the same column (i.e. from third stage column $2^n$), a second term from the third compression stage inter carry output 381 from the adjacent lower weighting column third compression cell (not shown) (i.e. from third stage column $2^{n-1}$), and a third term from the last output from the pipeline retiming stage 305 passed through the third compression stage 307.

The fourth stage compressor cell 309a outputs a sum term as a first compression circuit output term for the column (i.e. output A with a weighting of $2^n$) and a first carry output 383 as a compression circuit output which is passed to an adjacent higher weighting compression column to form the second output for the adjacent column (not shown) (i.e. output B with a weighting of $2^{n+1}$). The second output for the column similarly is the carry output 385 received from the adjacent lower weighting compression column (not shown).

As has been discussed previously, a problem associated with such a compression circuit is that each column requires 5 separate flip-flops. As there are typically 64 columns of compression, in order to handle the full 64-bit output as produced by stage0, the number of flip-flops required to retime the compression circuit is 64×5=320.

Although for most calculations at least some of the 320 flip-flops will not store values critical to the result and therefore be redundant, it is not possible to predict which flip-flops are redundant flip-flops until the operands are loaded into the multiplier.

Figure 5:
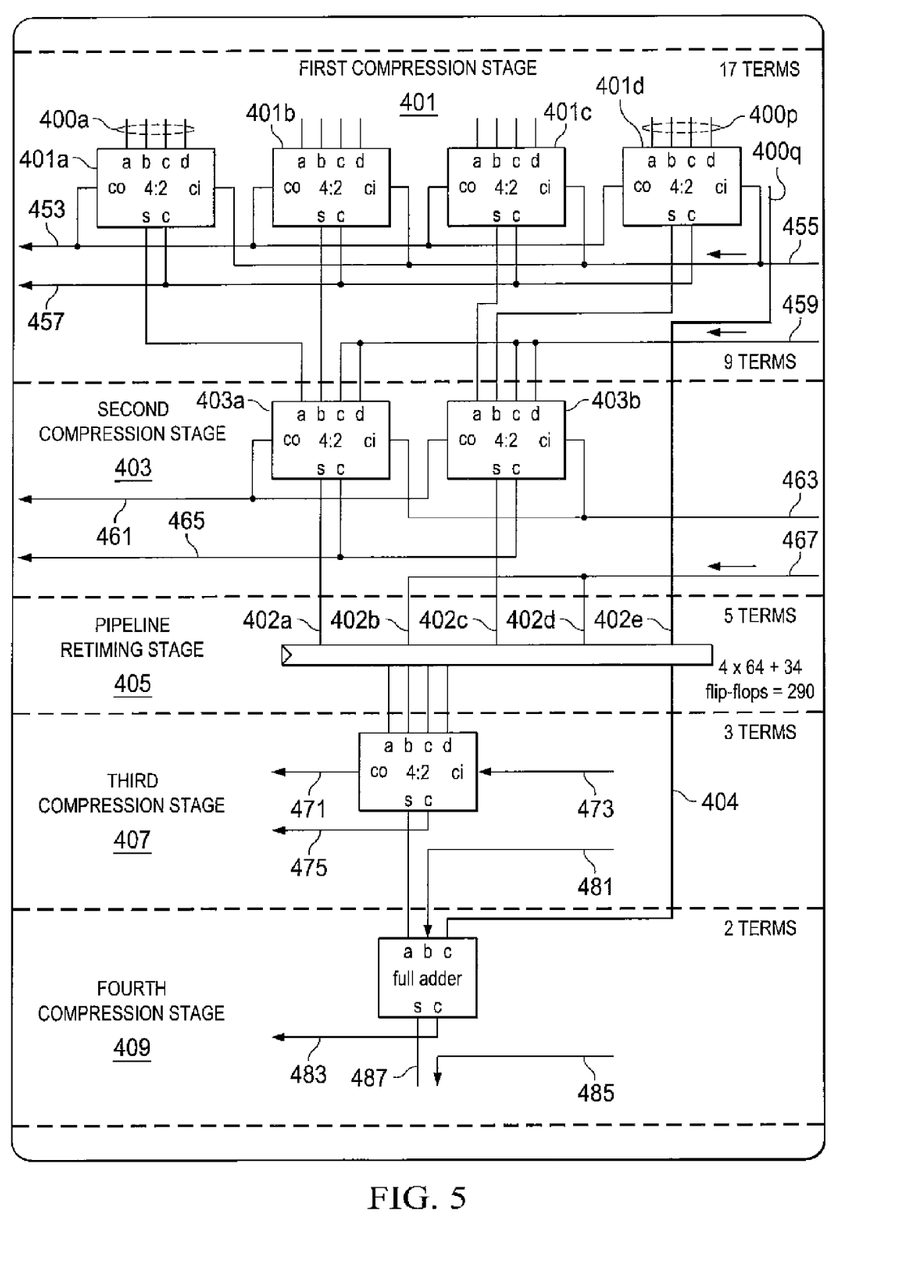
FIG. 5 shows a schematic view of part of a compression circuit according to a first embodiment of the present invention.

With reference to FIG. 5, a compression column 451 from an improved compression circuit featuring an embodiment of the present invention is shown.

In order to clearly show the improvement derived, the embodiment shown in FIG. 5 is implemented within the compression column handling the term bits with a weighting of $2^n$. The improved compression circuit comprises 4 compression stages 401, 403, 407, and 409 and a pipeline retiming stage 405.

The first compression stage 401 receives the 17 input terms, each with a bit weighting $2^n$, and comprises four 4:2 compressor cells 401a, 401b, 401c and 401d.

Each first stage compressor cell 401a, 401b, 401c, 401d receives as inputs 4 partial product terms (i.e. $2^n$) and an intra carry output 455 from an adjacent lower weighting first stage compression column (not shown) (i.e. from first stage column $2^{n-1}$).

Each first stage compressor cell 401 outputs a sum term which is passed to the second compression stage 403 (i.e. to second stage column $2^n$), an intra carry output which is passed to an adjacent higher weighting first stage compression column (not shown) (i.e. to first stage column $2^{n+1}$), and an inter carry output 457 which is passed to a adjacent higher weighting second stage compression column (not shown) (i.e. to second stage column $2^{n+1}$).

The first compression stage 401, in a manner similar to the conventional compression column 351, only processes 16 from the 17 partial product terms. However, unlike the conventional compression column, the $17^{th}$ term 400q is passed directly to the pipeline retiming stage 405 (i.e. to retiming stage column $2^n$).

The second compression stage 403 receives 8 terms from the first compression stage 401, 4 first compression stage sum outputs from the same column (i.e. from first stage column $2^n$) and 4 first compression stage inter carry outputs 459 from the adjacent lower weighting column (not shown) (i.e. from first stage column $2^{n-1}$).

The second compression stage 403 comprises two 4:2 compressor cells 403a, 403b. Each of the second stage compressor cells 403a, 403b receives two inputs from the first compression stage 401 sum output from the same column (i.e. from first stage column $2^n$), two further inputs from the first compression stage inter carry outputs 459 from the adjacent lower weighting column (not shown) (i.e. from first stage column $2^{n-1}$), and a fifth input from the intra carry output 463 from the second compression stage from the adjacent lower weighting column (not shown) (i.e. from second stage column $2^{n-1}$).

Each second stage compressor cell 301 outputs a sum term which is passed to the pipeline retiming stage 405 (i.e. to retiming stage column $2^n$), an inter carry output 465 which is passed to an adjacent higher weighting pipeline retiming stage (not shown) (i.e. to retiming stage column $2^{n+1}$), and an intra carry out term 461 which is passed to a adjacent higher weighting second stage compression column (not shown) (i.e. to second stage column $2^{n+1}$).

The second compression stage 403 processes all of the terms passed by the first compression stage 401.

The pipeline retiming stage 405 receives 5 terms, 2 second compression stage sum outputs from the same column (i.e. from first stage column $2^n$), 2 second compression stage inter carry outputs 467 from the adjacent lower weighting column (not shown) (i.e. from second stage column $2^{n-1}$), and the $17^{th}$ partial product term 400q.

The pipeline retiming stage 405 for each column comprises 5 flip-flops (which are not individually shown in FIG. 5), which as known in the art are capable of capturing and storing a bit value, which can then be released via an output on receipt of a clocked signal.

The pipeline retiming stage 405 can also be considered a clocked buffering of the received outputs.

The outputs from four of the five flip-flops are passed to the third compression stage 407. The output of the fifth flip-flop 404, the flip-flop associated with the input of the $17^{th}$ partial product term 400$q$, is passed directly to the fourth compression stage 409.

The third compression stage 407 comprises a single 4:2 compressor cell 407$a$, which receives the 4 terms passed from the pipeline retiming stage of the same column (i.e. from first stage column $2^n$) and a further input from a third compression stage intra carry output 473 from the adjacent lower weighting column (not shown) (i.e. from third stage column $2^{n-1}$).

The third stage compressor cell 407$a$ outputs a sum term which is passed to the fourth compression stage 409 (i.e. to fourth compression stage column $2^n$), an inter carry output 475 which is passed to an adjacent higher weighting fourth stage compression column (not shown) (i.e. to fourth compression stage column $2^{n+1}$), and an intra carry output 471 which is passed to an adjacent higher weighting third stage compression column (not shown) (i.e. to third stage column $2^{n+1}$).

The fourth compression stage 409 comprises a single full adder compressor cell 409$a$. However, some typical designs may use a 4:2 compressor cell (not shown), where only some of the inputs and outputs are used. The adder 409$a$ receives a term from the sum output of the third compression stage of the same column (i.e. from third stage column $2^n$), a second term from the third compression stage inter carry output 481 from the adjacent lower weighting column third compression cell (not shown) (i.e. from third stage column $2^{n-1}$), and a third term from the pipeline retiming stage 404.

The fourth stage compressor cell 409$a$ outputs a sum term as a first compression circuit output term 487 for the column (i.e. output A with a weighting of $2^n$) and a first carry output 483 as a compression circuit output which is passed to an adjacent higher weighting compression column to form the second output for the adjacent column (not shown) (i.e. output B with a weighting of $2^{n+1}$). The second output for the column similarly is the carry output 485 received from the adjacent lower weighting compression column (not shown).

In the embodiment shown in FIG. 5, the $17^{th}$ partial product term is that shown as stage16 157$q$ in FIG. 2. The partial product part of stage16 157$q$ is only 32 bits wide, and even when the input carry bit is combined with stage16 157$q$, as shown in FIG. 2, the complete term is only 34 bits wide.

As it is known in advance that the $17^{th}$ term will always be equal to zero for the compression columns with binary weighting of $2^{29}$ to $2^0$, it is therefore possible to produce a simplified compression column for these binary weightings with the following changes:

No flip-flop for the $17^{th}$ partial product term.

No fourth compression stage 409, as the third compression stage produces a final two output terms.

With respect to removal of the flip-flop for the $17^{th}$ partial product term, for those columns where the $17^{th}$ term is always equal to zero, a saving of 30 flip-flops is therefore made over a conventional compression circuit. This reduces the power consumption and the silicon area consumed by the multiplier.

With respect to the removal of the fourth compression stage 409 for the $17^{th}$ partial product term, for those columns where the $17^{th}$ term is always equal to zero, a saving of 30 full adders in a compression circuit produces similar benefits in silicon area and power consumption.

Furthermore, an additional advantage with the removal of the fourth compression stage for these columns is that the compressor cells handling the terms in the third compression stage columns with weightings $2^{29}$ to $2^0$ have less strict timing requirements than the other third compression stage columns, as these term bits only are required to pass through one compression stage before being passed to the final two-term adder.

Figure 6:
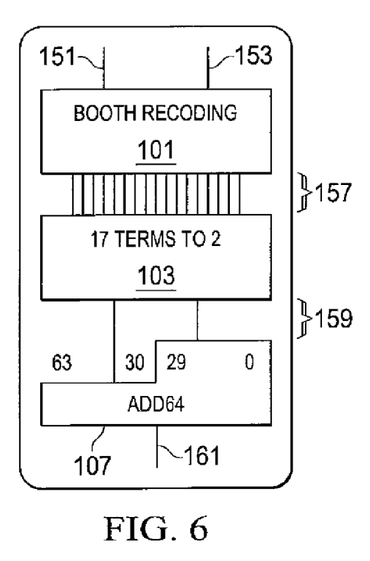
FIG. 6 shows a schematic view of a multiplier incorporating the embodiment as shown in FIG. 5.

Alternatively, as FIG. 6 shows, this reduction in stages can be used by the final adding stage. FIG. 6 shows a multiplier similar to that shown in FIG. 1, comprising the improved compression circuitry 104 and a modified final term adder stage, a modified 'add64' stage 107. As the improved compression circuitry outputs the final two terms for the bit weightings $2^{29}$ to $2^0$, the 'add64' stage 107 has a less strict timing requirement in which to produce the sum value for these bits when compared to the other bits. Therefore, it is possible to design a 'slower' bit adder for these bits with the known associated savings in power and silicon area over the fast adder circuits required for 'normal' speed bit adders required for the other bits.

In addition to these advantages associated with some of the compression columns, in the remaining columns where the $17^{th}$ partial product is not always a zero value, the delaying of the use of the $17^{th}$ partial product term produces the advantage that the value is only required before the pipeline retiming stage. This timing requirement is significantly later than the timing requirements imposed on the other 16 partial product terms, as the 16 other terms have to pass through two stages of compression cells before reaching the pipeline retiming stage. As the timing requirement on the $17^{th}$ partial product term is less restrictive, then less power intensive or area consuming circuitry can be employed to calculate the $17^{th}$ partial product, producing gains in silicon area or required power or both to be made with respect to the whole circuit.

As will be appreciated by a person skilled in the art, it is possible to apply the principle of delaying the application of partial product in other not shown embodiments.

Further embodiments of the present invention are those where the $17^{th}$ partial product term 400$q$ is any of the stages shown in FIG. 2. One such embodiment, where the $17^{th}$ partial product term 400$q$ is stage0 157$a$, saves no flip-flops or full adders as the partial product term is 64 bits wide. However, this embodiment of the present invention still maintains the timing advantage mentioned above with respect to the timing requirement imposed on the production of the $17^{th}$ partial product term being lower than the other 16 terms.

Figure 7:
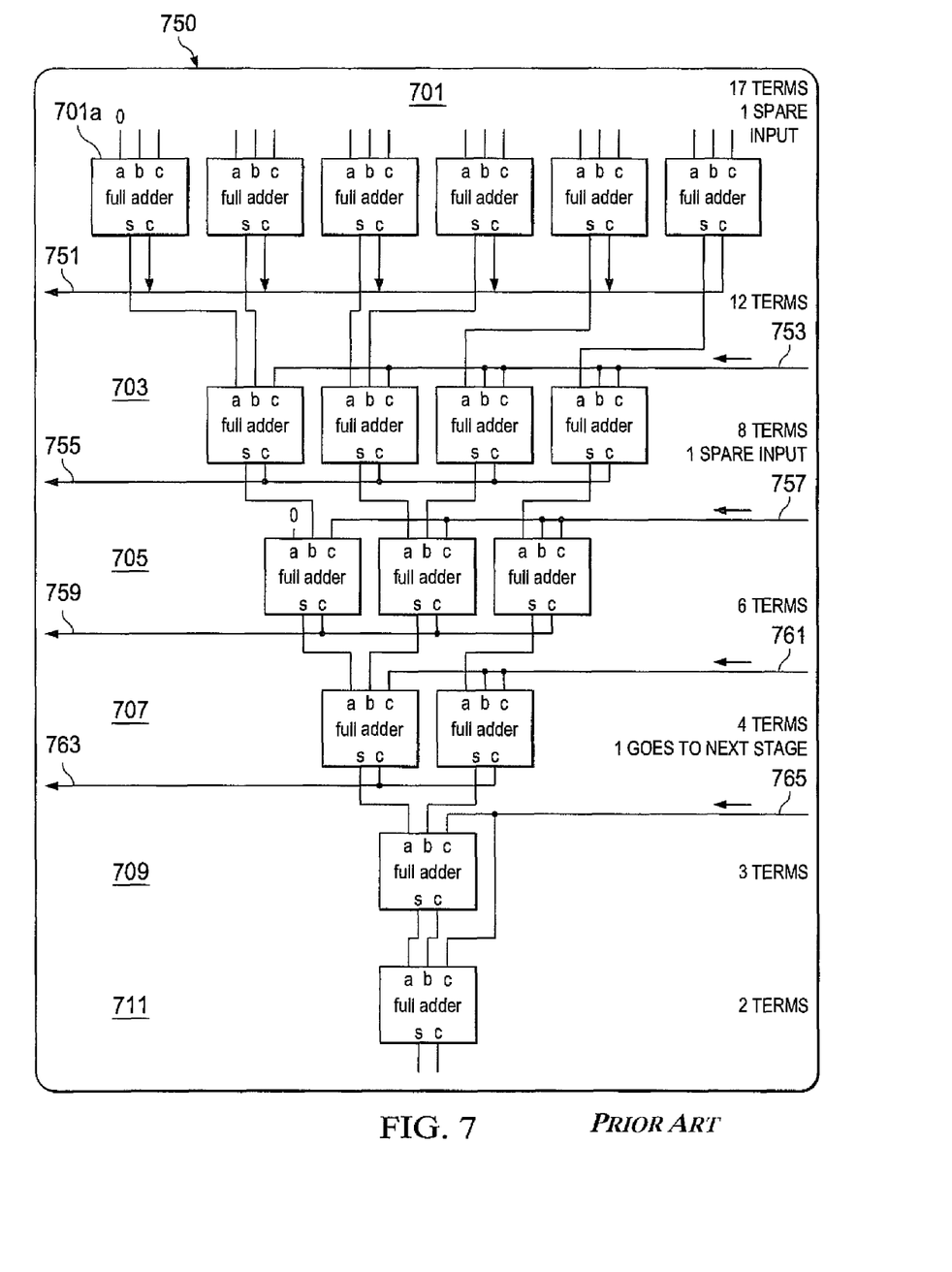
FIG. 7 shows a schematic view of part of a compression circuit using full adders.
Figure 8:
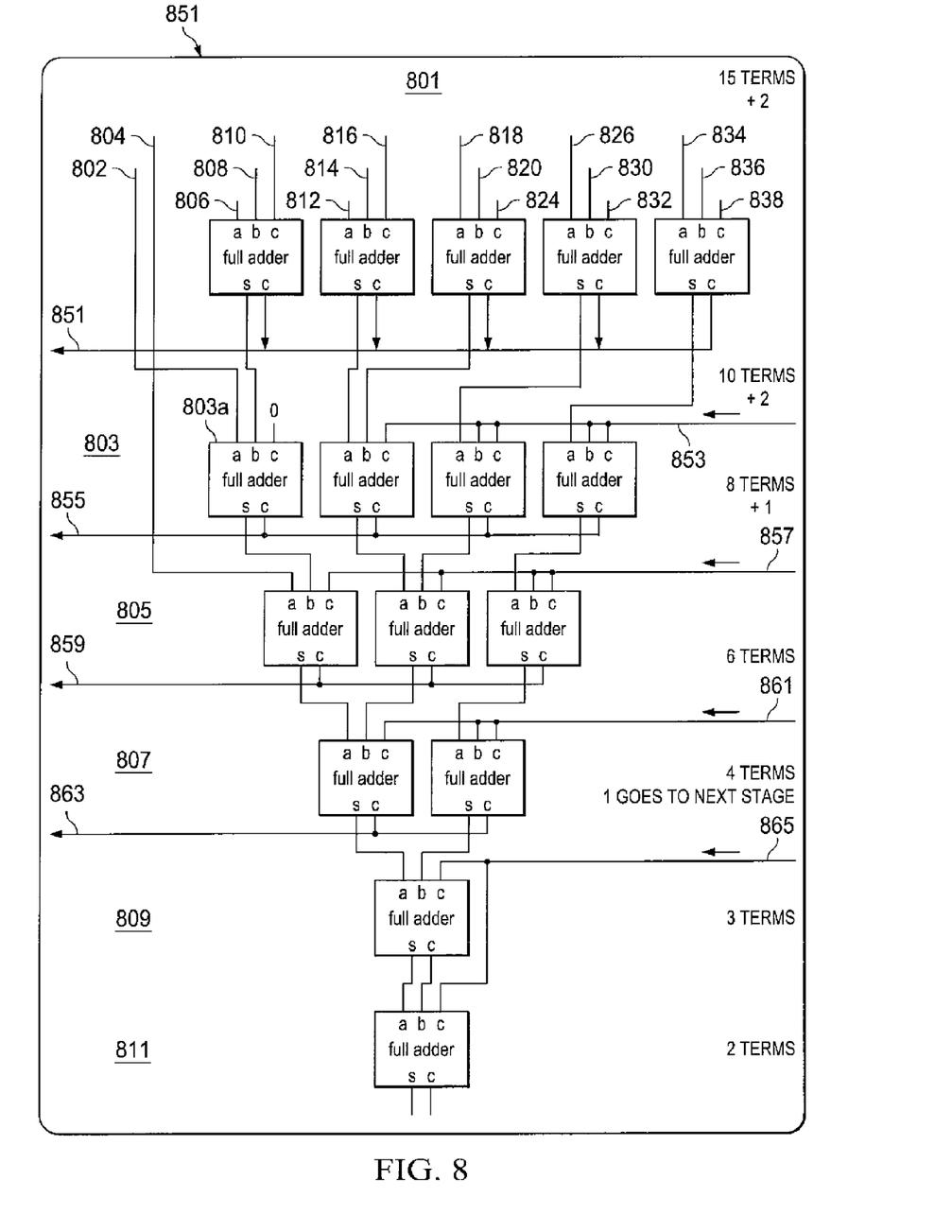
FIG. 8 shows a schematic view of part of a compression circuit according to a second embodiment of the present invention.

Further embodiments of the present invention delay the application of more than one term as can be shown with respect to FIGS. 7 and 8.

FIG. 7 shows a further column of conventional compression circuitry, comprising only full adders.

The conventional compression circuit column 750 for compressing 17 terms to 2 terms comprises 6 stages of compression.

In the first compression stage 701, the 17 partial product terms plus a spare input term are compressed to 12 terms. The first compression stage comprises 6 full adders, five of which receive three partial product terms, and the sixth full adder receives the remaining two partial product terms and the spare input term. Each of the first compression stage 701 adders outputs a sum term, which is passed to the second compression stage 703, and a carry term 751, which is passed to the second compression stage of the adjacent column with a higher binary weighting (not shown). Similarly, the carry outputs 753 from the adjacent column with a lower binary weighting (not shown) are passed to the second compression stage 703 so that the number of carry output terms passing to an adjacent column with a higher binary weighting (not shown) is equal to the number of carry outputs received from an adjacent column with a lower binary weighting (also not shown).

The second compression stage 703 comprising four full adders compresses the 12 terms from the first compression stage 703 to 8 terms, which are passed to the third compression stage 705. The second compression stage 703 passes a number of carry outputs 755 to an adjacent column with a higher binary weighting (not shown) and receives a number of carry outputs 757 from an adjacent column with a lower binary weighting (not shown).

The third compression stage 705 comprising three full adders compresses the 8 terms received from the second compression stage 703 to 6 terms, which are passed to the fourth compression stage 707. The third compression stage 705 passes a number of carry outputs 759 to an adjacent column with a higher binary weighting (not shown) and receives a number of carry outputs 761 from an adjacent column with a lower binary weighting (not shown).

The fourth compression stage 707 comprising two full adders compresses the 6 terms received from the third compression stage 705 to 4 terms, of which 3 terms are passed to the fifth compression stage 709 and the remaining term to the sixth compression stage 711. The fourth compression stage 707 passes a number of carry outputs 763 to an adjacent column with a higher binary weighting (not shown) and receives a number of carry outputs 765 from an adjacent column with a lower binary weighting (not shown).

The fifth compression stage 709 comprising a single full adder compresses the 3 terms received from the fourth compression stage 707 to 2 terms, which are passed to the sixth compression stage.

The sixth compression stage 711 comprising a single full adder compresses the two terms received from the fifth compression stage 709 and the single term from the fourth compression stage 707 to 2 terms, which are output to the final term combiner (not shown)

As can be seen in FIG. 7, in the first compression stage 701 and the third compression stage 705, at least one of the full adder circuits contains a redundant or spare input. This spare input is conventionally tied to ground to prevent any electrical interference creating errors. As these adders are not being used to their full potential, the circuit is not optimally designed and wastes silicon area.

An improved compression circuit column 850 is shown in FIG. 8.

The improved compression circuit column 850 for compressing 17 terms to 2 terms also comprises 6 stages of compression.

In the first compression stage 801, 15 partial product terms are compressed to 10 terms. The first compression stage comprises 5 full adders, each of which receives three partial product terms. Each of the first compression stage 801 adders outputs a sum term, which is passed to the second compression stage 803, and a carry term 851, which is passed to the second compression stage of the adjacent column with a higher binary weighting (not shown). Similarly, the carry outputs 853 from the adjacent column with a lower binary weighting (not shown) are passed to the second compression stage 803.

The second compression stage 803 comprising four full adders compresses the 10 terms from the first compression stage 803 and the $16^{th}$ partial product term 802 to 8 terms, which are passed to the third compression stage 805. The second compression stage 803 passes a number of carry outputs 855 to an adjacent column with a higher binary weighting (not shown) and receives a number of carry outputs 857 from an adjacent column with a lower binary weighting (not shown).

The third compression stage 805 comprising three full adders compresses the 8 terms received from the second compression stage 803 and the $17^{th}$ partial product term 804 to 6 terms, which are passed to the fourth compression stage 807. The third compression stage 805 passes a number of carry outputs 859 to an adjacent column with a higher binary weighting (not shown) and receives a number of carry outputs 861 from an adjacent column with a lower binary weighting (not shown).

The fourth compression stage 807 comprising two full adders compresses the 6 terms received from the third compression stage 805 to 4 terms, of which 3 terms are passed to the fifth compression stage 809 and the remaining term to the sixth compression stage 811. The fourth compression stage 807 passes a number of carry outputs 863 to an adjacent column with a higher binary weighting (not shown) and receives a number of carry outputs 865 from an adjacent column with a lower binary weighting (not shown).

The fifth compression stage 809 comprising a single full adder compresses the 3 terms received from the fourth compression stage 807 to 2 terms, which are passed to the sixth compression stage.

The sixth compression stage 811 comprising a single full adder compresses the two terms received from the fifth compression stage 809 and the single term from the fourth compression stage 807 to 2 terms, which are output to the final term combiner (not shown).

The circuit as shown in FIG. 8 above has two advantages over the conventional circuit as shown in FIG. 7. The removal of a full adder from the first compression stage allows that, for a full compression circuit 64 bits wide, up to 64 full adder circuits can be saved, with a saving in terms of circuit area and power consumption. Furthermore, the $16^{th}$ and $17^{th}$ partial product terms are used later than the other 15 partial product terms. As the timing requirement on the $16^{th}$ and $17^{th}$ partial product term is less restrictive, then less power intensive or area consuming circuitry can be employed to calculate these partial products, producing gains in silicon area or required power or both to be made with respect to the whole circuit.

In a further embodiment of the invention, the $16^{th}$ and $17^{th}$ partial product terms are the partial product terms represented by stage15 157$p$ and stage16 157$q$. A skilled person could simplify the column by removing up to an additional two full adders per column for the columns where stage15 157$p$ and stage 16 157$q$ have no value in a manner similar to the first embodiment.

As shown in both embodiments, the introduction of partial product terms in later stages where there is capacity produces not only timing improvements but also removes the need for redundant circuitry.

It would be further appreciated by a skilled person that the invention is applicable to a range of multiplier operand bit widths, compressor cell selections, and compression algorithms. Thus, the invention is advantageously applicable to any multiplier circuit whereby the number of partial product terms is not exactly a multiple of the available inputs of the compressor cells used within a first stage compression circuit.

It is intended that the present invention encompass such changes and modifications as fall within the scope of the appended claims.

What is claimed is:

1. Combining circuitry for combining a plurality of multibit partial product terms in a multiplier circuit, said circuitry comprising a plurality of compression columns, each column receiving a plurality of unprocessed partial product term bits, at least one compression column comprising:

a first circuit arranged to receive a first set of the plurality of unprocessed partial product term bits for the at least one compression column, the first circuit further arranged to combine the first set of the plurality of unprocessed partial product term bits to produce a first combined term bit set; and a second circuit arranged to receive a second set of the plurality of unprocessed partial product term bits for the at least one compression column and all of the first combined term bit set, wherein the second circuit is a clocked buffer arranged to output the second set of the plurality of unprocessed partial product term bits and all of the first combined term bit set to a pipeline retiming stage dependent on a clocked input.

2. The combining circuitry as claimed in claim 1, wherein the at least one column further comprises a third circuit arranged to receive all of the first combined term bit set, and is further arranged to combine the first combined term bit set to produce a second combined term bit set.

3. The combining circuitry as claimed in claim 2, wherein the at least one column further comprises a fourth circuit arranged to receive the second combined term bit set from the third circuit and the second set of plurality of unprocessed partial product term bits from the second circuit and is further arranged to combine the second combined term bit set and the second set of plurality of unprocessed partial product term bits to produce a pair of term bits.

4. The combining circuitry as claimed in claim 3, wherein said combining circuitry comprises a first number of compression columns and a second number of further compression columns.

5. The combining circuitry as claimed in claim 4, wherein the first number of compression columns is equal to the number of bits of the widest of the second set of the plurality of terms.

6. The combining circuitry as claimed in claim 5, wherein in the second number is equal to the first number subtracted from the number of bits of the widest of the plurality of partial product terms.

7. The combining circuitry as claimed in claim 1, further comprising at least one further compression column comprising:
a further first circuit arranged to receive a third set of the plurality of unprocessed partial product term bits for the further compression column, the further first circuit further arranged to combine the third set of unprocessed partial product term bits to produce a third combined term bit set; and
a further second circuit arranged to receive all of the third combined term bit set.

8. The combining circuitry as claimed in claim 7, wherein the further second circuit is a clocked buffer arranged to output all of the third combined term bit set dependent on a clocked input.

9. The combining circuitry as claimed in claim 8, wherein the at least one further compression column further comprises a further third circuit arranged to receive all of the third combined term bit set, and is further arranged to combine the third combined term bit set to produce a fourth combined term bit set.

10. The combining circuitry as claimed in claim 9, wherein the fourth combined term bit set from the further third circuit is a pair of bits.

11. The method as claimed in claim 1, further comprising at least one further compression column comprising:
receiving, at a further first circuit in at least one further compression column, a third set of the plurality of unprocessed multi-bit partial product terms for the further compression column; and
combining, at the further first circuit, the third set of the plurality of unprocessed multi-bit partial product terms to produce a third combined term bit set; and
receiving, at a further second circuit in the at least one further compression column, all of the third combined term bit set.

12. The method as claimed in claim 11, wherein the further column second circuit is a clocked buffer arranged to output all of the third combined term bit set dependent on a clocked input.

13. The method as claimed in claim 12, further comprising:
receiving, at a further third circuit in the at least one further compression column, all of the third combined term bit set; and
combining, at the further third circuit in the at least one further compression column, the third combined term bit set to produce a fourth combined term bit set.

14. The method as claimed in claim 13, wherein the fourth combined term bit set from the further third circuit is a pair of bits.

15. A method for combining a plurality of unprocessed multi-bit partial product terms in a compression column of a multiplier circuit, comprising the steps of:
receiving, at a first circuit, a first set of the plurality of unprocessed multi-bit partial product terms for the at least one compression column;
combining, at a first circuit, the first set of the plurality of unprocessed multi-bit partial product terms to produce a first combined term bit set;
receiving, at a second circuit, a second set of the plurality of unprocessed multi-bit partial product terms for the at least one compression column and all of the first combined term bit set; and
outputting, at the second circuit, the second set of the plurality of unprocessed multi-bit partial product terms and all of the first combined term bit set to a pipeline returning stage.

16. The method as claimed in claim 15, further comprising:
receiving, at a third circuit, all of the first combined term bit set; and
combining, at the third circuit, the first combined term bit set to produce a second combined term bit set.

17. The method as claimed in claim 16, further comprising:
receiving, at a fourth circuit, the second combined term bit set from the third circuit; and the second set of the plurality of multi-bit partial product terms from the second circuit; and
combining, at the fourth circuit, the second combined term bit set and the second set of the plurality of unprocessed multi-bit partial product terms to produce a pair of term bits.

18. The method as claimed in claim 17, further comprising a first number of compression columns and a second number of further compression columns.

19. The method as claimed in claim 18, wherein the first number of compression columns is equal to the number of bits of the widest of the second set of the plurality of terms.

20. The method as claimed in claim 19, wherein in the second number is equal to the first number subtracted from the number of bits of the widest of the plurality of partial product terms.

* * * * *